United States Patent [19]
Lee

[11] Patent Number: 5,657,257
[45] Date of Patent: Aug. 12, 1997

[54] POWER-SUPPLY CONTROLLER OF COMPUTER

[75] Inventor: Kyung-Sang Lee, Suwon, Rep. of Korea

[73] Assignee: Samsung Electronics Co., Ltd., Suwon, Rep. of Korea

[21] Appl. No.: 502,699

[22] Filed: Jul. 14, 1995

[30] Foreign Application Priority Data

Sep. 28, 1994 [KR] Rep. of Korea .................. 94-24513

[51] Int. Cl.$^6$ ............................................. G06F 1/00
[52] U.S. Cl. .............................. 364/707; 395/750.05
[58] Field of Search ........................ 364/707; 395/750; 363/65

[56] References Cited

U.S. PATENT DOCUMENTS

| 5,319,536 | 6/1994 | Malik | 363/65 |
| 5,410,713 | 4/1995 | White et al. | 395/750 |
| 5,530,878 | 6/1996 | Bauer et al. | 395/750 |
| 5,532,935 | 7/1996 | Ninomiya et al. | 364/492 |

*Primary Examiner*—Chuong D. Ngo
*Attorney, Agent, or Firm*—Cushman Darby & Cushman, Ip Group Of Pillsbury Madison & Sutro LLP

[57] ABSTRACT

The power-supply controller of a computer can minimize power-consumption as shown in the following description. The operation mode will convert to a sleep-mode reducing the power-consumption below a constant voltage if there is no input to operate a computer system for a predetermined period of time. If the condition of no input for operating a computer system persists, the power supply controller cuts off the power-supply once again. In order to achieve this object, this invention is composed of a power-supply, a power-controller, and a power-mode-controller. The power-supply includes a first rectifier that converts an AC voltage to a DC voltage, a DC/AC converter which converts a DC voltage into an AC voltage, a switching mechanism which outputs a pulse signal used to operate the DC/AC converter, a second rectifier which converts to a DC voltage from an AC voltage received from the DC/AC converter, and a driver which provides an operation voltage to operate the switching mechanism. The power-controller outputs a power-supply signal used to change from the sleep-mode into a power-off mode if there is no input for a predetermined period during the sleep-mode, and which outputs a power-supply signal to change from the power-off mode into a resume-mode if there is an input. The power-mode-controller also includes a power-mode control circuit that varies the output from the power-controller and varies an operation voltage to operate the switching mechanism and a charger which charges a battery with AC voltage and provides the power-controller with a power-supply.

4 Claims, 2 Drawing Sheets

POWER-SUPPLY CONTROLLER OF COMPUTER

BACKGROUND OF THE INVENTION

1. Field of the Invention

The present invention relates to a power-supply controller of a computer which minimizes power-consumption. If there is no user input for a predetermined period of time, the controller reduce the power-supply to the computer and peripherals. If there is still no input after another period of time, the present invention further reduces the power-supply to the computer and its peripherals.

2. Description of the Related Art

In recent times, products for achieving both power savings and environmental protection have been the market trend.

Most of the power-supply controllers of computer systems can minimize the propagation of electromagnetic waves and reduce power-consumption by cutting off the power source when a user intentionally turns off a power-switch or selects a reduced power operation mode.

Environmental groups in the United States and Europe, in particular, are requiring power saving mechanisms for computer systems. Their plan is to reduce the large power loss from idle computer systems by making power saving mechanisms on computer systems compulsory. For this purpose, many personal computers including notebook computers have been equipped with a means for saving power.

The present invention automatically turns off peripheral devices such as hard disks, floppy disks, video cards and other peripherals added to the computer system when a user does not input any information for a predetermined period of time. Thus, the power-saving method of the present invention reduces power-consumption effectively in all of the peripheral equipment of the computer system. In a normal mode of the computer's operation, if there is no keyboard input for a predetermined period of time, or no command from the peripheral equipment to the Central Processing Unit (CPU), the computer enters a sleep-mode from the normal mode by which power is conserved. The sleep-mode controls the amount of power which is supplied to each peripheral device (HDD, Monitor, CPU Clock, etc.).

However, when the computer is in the sleep-mode and power is cut-off from the peripheral equipment, a resume-mode will be entered when there is any input or command which requires the operation of the computer system again from either the peripheral equipment, or from the keyboard. Consequently, the resume-mode also controls the amount of power which is supplied to each of the peripheral devices.

Without the present invention, a constant power of about 30 Watts produced by the power-supply is consumed continuously. In other words, when the computer is not being used, the repeated operation of changing from normal-mode to sleep-mode can decrease the power-consumption below 30 Watts thereby reducing unnecessary power loss and waste. Consequently, about 30 Watts is consumed if the power-supply is not interrupted as in the present invention.

SUMMARY OF THE INVENTION

It is an object of the present invention to provide a power-supply controller of a computer that will minimize power-consumption. The present invention changes a computer from normal operating mode into a sleep-mode which reduces the power-consumption if there is no input requiring the operation of the computer system for a predetermined period of time. If the computer remains idle, the controller further reduces the power-supply which is supplied to both the CPU and the internal memory.

In order to achieve this object, the present invention comprises a power-supply means, a power-control means, and a power-mode-controlling means.

The power-supply means includes a first rectifier that converts an AC voltage into a DC voltage, a DC/AC converter which converts the DC voltage obtained from the first rectifier into an AC voltage, a switching means which outputs a pulse signal to operate the DC/AC converter, a second rectifier which converts an AC voltage obtained from the DC/AC converter into a DC voltage, and a driver which provides an operation voltage to operate the switching means.

In the mode in which the computer system is normally operated, if there is no keyboard input for a predetermined period of time, or no command from the peripheral equipment to the CPU, the computer changes from the normal mode to a sleep-mode. The power-control means outputs a power-supply signal to change from the sleep-mode to a power-off mode if there is no input for a predetermined period of time during the sleep-mode. The power-control means also outputs a power-supply signal to change from the power-off mode to resume-mode if there is any input requiring the system to resume normal operations.

The power-mode-controlling means includes a power-mode control circuit which operates a power-supply signal that varies the output from the power-control means, varies the operation voltage required to operate the switching means of the power-supply means for driving the system, and also operates a charging device which charges a battery with AC voltage which in turn provides the power-control means with the required power-supply.

DETAILED DESCRIPTION OF THE PREFERRED EMBODIMENT

A preferred embodiment of the present invention will become apparent from a study of the following detailed description when viewed in light of the accompanying drawings, in which.

Figure 1:
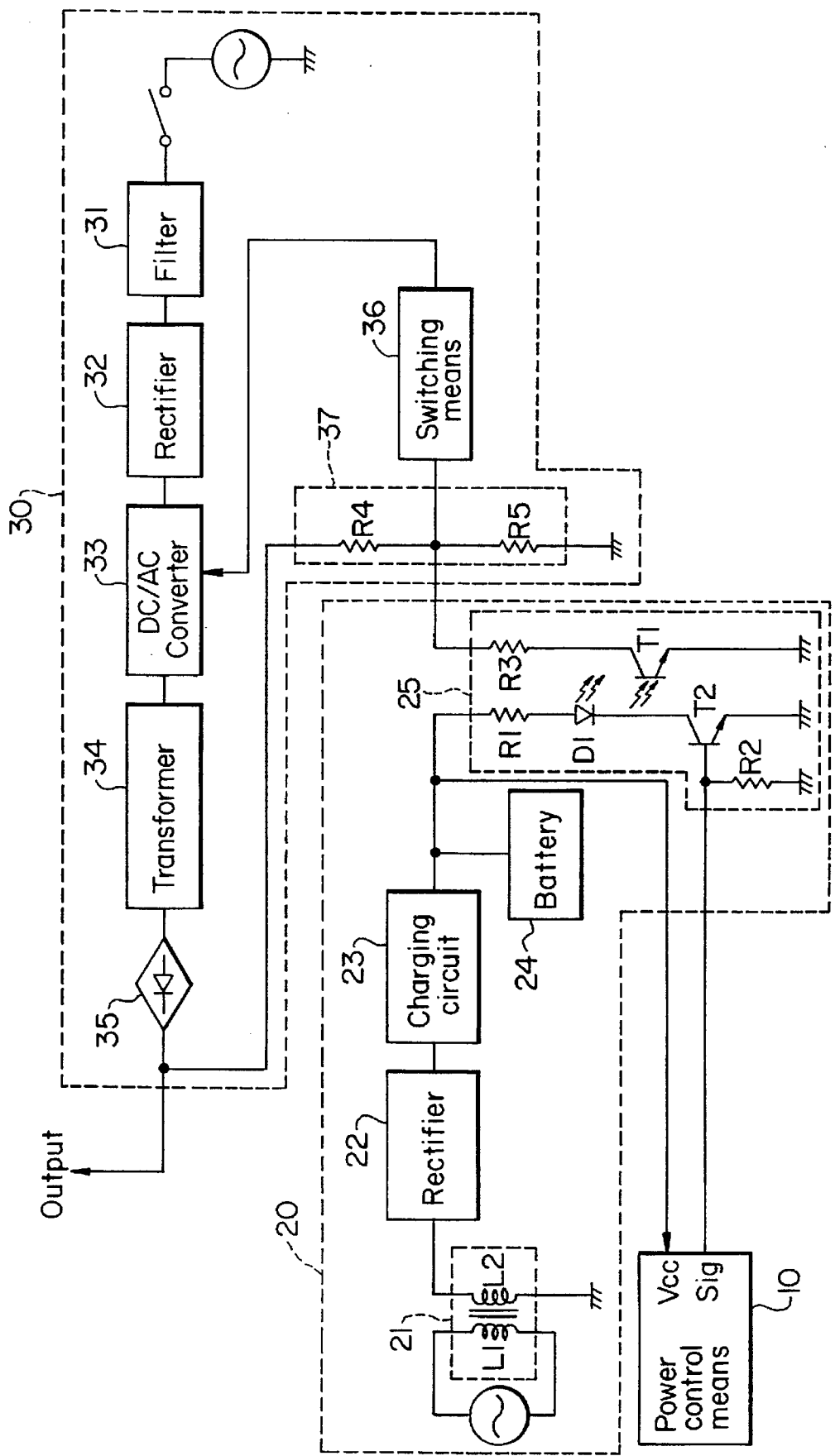
FIG. 1 is a circuit diagram of a power-supply controller of a computer in accordance with the preferred embodiment.

As shown in FIG. 1, the power-supply controller of a computer is comprised of the following subsystems in accordance with a preferred embodiment of the present invention:

- a power-control means (10) which outputs a power-supply signal as an input to every peripheral device and Input/Output subsystem (not shown in the Figures);
- a power-mode-controlling means (20) which outputs a power-mode signal as an input power-supply signal to the output unit of the power-control means (10); and
- a power-supply means (30) which provides a power-supply derived from an input power-mode signal, which is connected with the output unit of the power-mode-controlling means (20).

In the preferred embodiment of this invention, power-mode-controlling means (20) is composed of first transformer (21) of which one terminal is connected with alternating power, and of which the other terminal is connected with rectifier (22). The rectifier (22) is in turn connected to charging circuit (23) which is also connected with battery (24) which is charged with power by the input current through charging circuit (23). After charging, battery (24) supplies the charged power to power-mode control circuit (25) according to a power-supply signal from power-control means (10). The charging circuit is also connected to power-mode control circuit (25) which outputs a power-mode signal as the power-supply signal.

The power-supply means (30) is composed of power-supply switch (S1) of which one terminal is connected with AC power, and the other is connected to filter (31). One terminal of the filter is connected with power-supply switch (S1), and the other is connected to rectifier (32). One terminal of the rectifier is connected with the output unit of filter (31) which outputs DC power from input AC power. The other terminal of filter (31) is connected to DC/AC converter (33). The DC/AC converter (33) is in turn connected with the output unit of rectifier (32), and second transformer (34). The second transformer (34) is connected with the output unit of DC/AC converter (33), and rectifier (35) which is in turn connected with switching means (36). The switching means (36) outputs a pulse signal to operate DC/AC converter (33), and driver (37) which provides operation power to operate switching means (36) as the input signal from power-mode controlling means (20).

In the preferred embodiment of the present invention, power-mode-control circuit (25) is composed of resistor (R1) of which one terminal is connected with the output unit of charging circuit (23), and the other terminal is connected to the anode of light emitting diode (D1) of a photocoupler. The power-mode-control circuit is also composed of transistor (T2) of which the collector is connected with the cathode terminal of light emitting diode (D1); the emitter terminal is grounded, and the base terminal is connected with output terminal (Sig) of power-control means (10). The power-mode-control circuit is also composed of resistor (R2) having one side terminal connected with output terminal (Sig) of power-control means (10) and the other side grounded, and resistor (R3) having one terminal connected with switching means (36). The power-mode-control circuit is also composed of transistor (T1), having the collector terminal is connected with the other terminal of resistor (R3), and the emitter terminal grounded. The driver (37) is composed of resistor (R4), having one terminal connected with the output terminal of rectifier (35) and the other terminal connected to resistor (R5) which is grounded at its other terminal.

The switching means (36) is composed of a Pulse Width Modulation Integrated Circuit (PCM IC) which outputs a pulse signal in accordance with the inputted DC voltage.

Also, according to the preferred embodiment of the present invention, a conversion method which obtains DC power from AC power supplied by power-supply means (30) is composed of a switching method regulator with a pulse width modulation.

According to the preferred embodiment of the present invention the operation of the power-supply controller of a computer is described in the following section.

During the operation of the computer system, power-control means (10) determines the operation status (yes or no) for every peripheral device including all hard dish and floppy disks, (not shown in drawings). If no devices are operational, it perform the sleep-mode operation which cuts off the power when there is no keyboard input for a predetermined time period, and no command from any peripheral device or monitor. As a result, even though power is not supplied to every peripheral device and monitor, power will be provided to the Central Processing Unit of the computer and the memory (not shown in the drawings).

Figure 2:
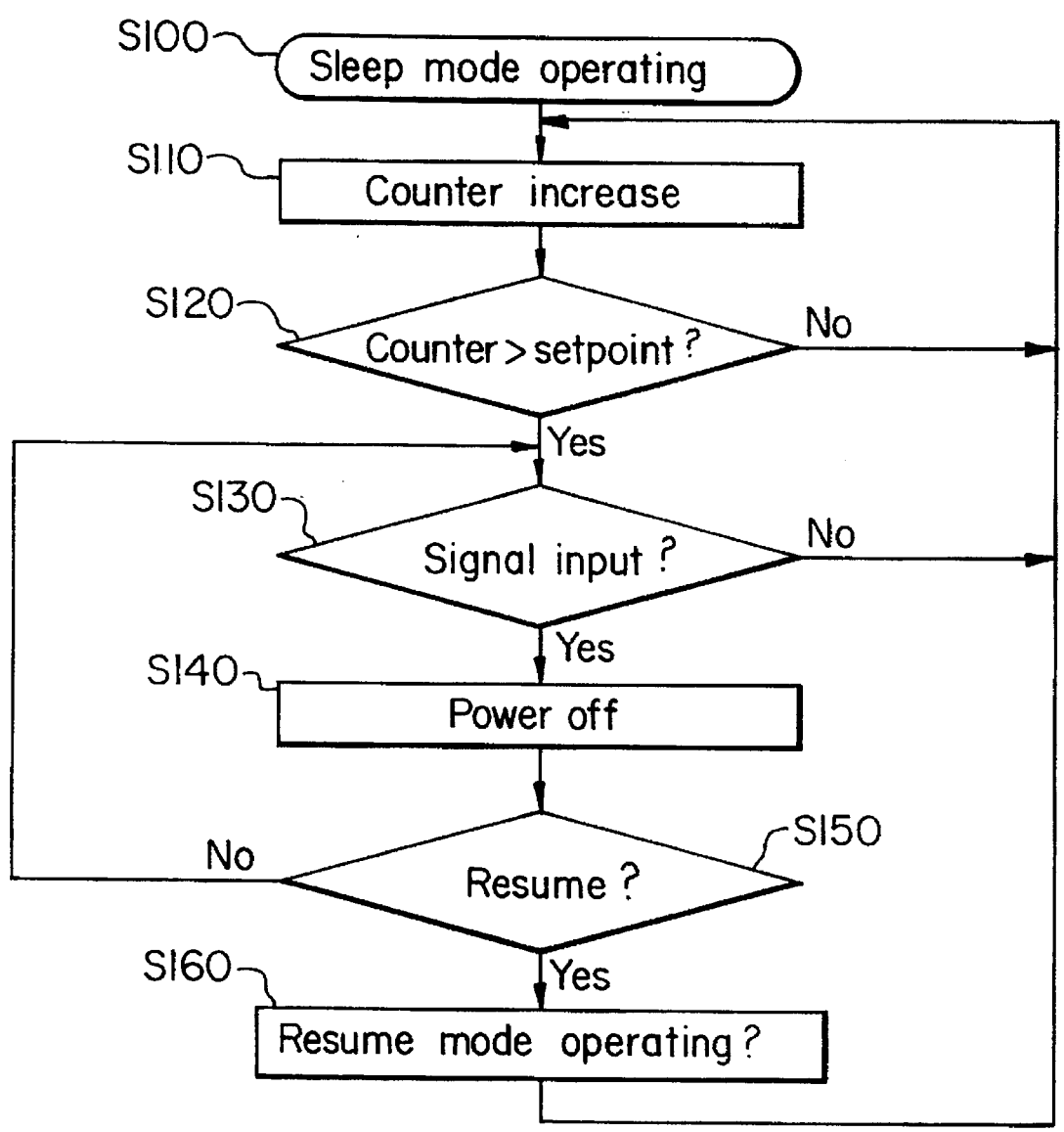
FIG. 2 is an operation flowchart of a power-supply controlling method of a computer in accordance with a preferred embodiment of the present invention.

During the sleep-mode, power-supply means (30) outputs a constant voltage. As shown in FIG. 2, power-control means (10) performs the sleep-mode, increases a fixed counter for determining whether a predetermined period of time has elapsed, and examines a relation between the setpoint corresponding to a setting timer for judging whether there is an input signal during the sleep-mode and the counter value (S100–S120).

When the counter value is beyond the setpoint, the power-control means (10) checks the operational status of every peripheral device, and checks for an input from the keyboard. It regards the system as being stopped if there is no input to operate a computer system for a predetermined period of time while already in sleep mode. As a result, a power-off operation will be performed should a system already in sleep mode be judged to be stopped.

As the present invention uses a Switching Mode Power Supply (SMPS) in the preferred embodiment of power-supply means (30), if power switch (S1) turns on, driver (37) divides the DC voltage using resistors 4 and 5 which operate switching means (36), namely, the PWM IC as shown in FIG. 1.

In the above operation, power switch (S1) can turn the output voltage of power-supply means (30) on or off. However, the preferred embodiment of the present invention cuts off the power using the following operations when the system is idle for a predetermined period of time, regardless of whether power switch (S1) is turned on or not.

By outputting a power-supply signal at a high voltage, power-control means (10) is able to cut-off the output voltage from the power-supply. The high voltage signal from power control means (10) is applied to the base terminal of transistor (T2) in the power-mode-controlling means.

The transistor (T2) turns on due to the application of the high voltage signal to the base terminal of transistor (T2) in power-mode-control circuit (25). Input AC power from power-mode controlling means (20) is strengthened through first transformer (21) and converted to a DC voltage by rectifier (22). The current corresponding to the DC voltage flows through the light emitting diode of photocoupler (D1). As light emitting diode (D1) is luminesced, a current corresponding to the variance of the light flows according to an incidence of light through the base terminal of photo-transistor (T1). As photo-transistor (T1) turns on, the AC power corresponding to operation power-switch (S1) of power-supply (30) is rectified and converted into an AC voltage by DC/AC converter (33) which is operated by a pulse signal of switching means (36). The voltage is again converted to a DC voltage by second transformer (34) and rectifier (35), and a current corresponding to the voltage then flows from photo-transistor (T1) through resistor (R4), and resistors (R3) and (R5).

As the current flows through photo-transistor (T1), terminal resistor (R3) becomes grounded. This creates a circuit in which resistances R3 and R5 are in parallel and together are in series with resistor R4. The DC voltage is then split between resistor R4 and the equivalent of parallel resistors R3 and R5. The voltage across resistors R3 and R5 then becomes the input to switching means (36).

In other words, the parallel connection of resistors (R3, R5) lowers the voltage which is applied to switching means (36) below the required voltage, and does not operate switching means (36).

As the operation of switching means (36) stops due to a low input voltage, DC/AC converter (33) is also turned off because a pulse signal from the switching means is not applied to it. Thus, regardless of power switch (S1), a current which is changed into a DC voltage through rectifier (32) is changed into AC power and is not applied to second transformer (34). Consequently, the DC voltage which is normally applied to all of the peripheral devices through power-supply (30) does not result and is effectively cutoff.

In the case that a signal input for the power-supply is at a high voltage when the system is idle for a predetermined period during the turning on of a sleep-mode, power-control means (10) changes to a power-off mode and stops the application of the DC voltage to each peripheral device by power-supply (30).

During the power-off mode mentioned above, if there is any input requiring system operation, power-control means (10) changes from the preset power-off mode to a resume mode (See FIG. 2, S150).

To provide each peripheral device with power from power-supply (30), power-control means (10) outputs a power-supply signal which is a low voltage. As transistor (T1) turns off due to the low voltage power-supply signal applied to it, light emitting diode (D1) does not output light because there is no current flow through it.

The photo-transistor (T1) is then turned off as light emitting diode (D1) stops emitting and therefore the current which is outputted through rectifier (35) flows through resistors (R4,R5). Thus, the distribution voltage by resistors (R4,R5) which corresponds to a preset operation voltage of switch means (36) is applied to it. The switch means (36) then outputs a pulse signal to DC/AC converter (33), the output DC voltage is converted to an AC voltage by rectifier (32) and is converted again to a DC voltage by second transformer (34) and rectifier (35).

As described above, power-control means (10) operates power-supply (30) by performing a resume-mode, again providing each peripheral device and monitor with power. In the preferred embodiment of the present invention, the power-supply controller reverts to the sleep-mode if there is no keyboard input to the system for a predetermined period of time. This mode lowers the power consumption below 30 Watts. If the condition of no input persists, it again reduces the power-supply and lowers the power-consumption below 2 W.

Also, in a portable computer of which power saving is especially important, this invention can make it possible to extend the life of a battery by minimizing needless power consumption.

What is claimed is:

1. A power-supply controller for a computer operable in a normal mode, a sleep mode, and a power-off mode, comprising:

a power supply including a first rectifier which converts a first AC voltage provided by a first AC voltage source into a first DC voltage, a converter for receiving said first DC voltage from said first rectifier and for converting said first DC voltage into a second AC voltage, a switching mechanism for outputting a pulse signal to operate said converter, and a driver which provides an operation voltage to operate said switching mechanism;

power control means for outputting a first power-supply signal operable to change a mode of operation of said power supply controller from a normal mode to a sleep mode after a first predetermined period of time if said power control means fails to receive an input signal within said first predetermined period of time, said power-control means outputting a second power-supply signal operable to change a mode of operation of said power supply controller from said sleep mode to a power-off mode after a second predetermined period of time subsequent to said first predetermined period of time if said power control means fails to receive an input signal within aid second predetermined period of time, wherein said power control means returns a mode of operation of said power supply controller to said normal mode from said sleep mode, when said power control means receives said input signal during said second predetermined period, and returns a mode of operation of said power supply controller to said normal mode from said power-off mode, when said power control means receives said input signal after said second predetermined period; and power-mode-controlling means including a power-mode control circuit which receives a power-supply signal from an output of said power-control means that varies a voltage used to operate said driver of said power-supply, a second rectifier for converting a second AC voltage provided by a second AC voltage source into a second DC voltage, a charging circuit electrically connected with said second rectifier to receive said second DC voltage for charging a battery and for providing said power-control means with a power-supply.

2. The power-supply controller for a computer as defined in claim 1, wherein said power mode control circuit comprises:

a transistor having a base, a collector, and an emitter terminal, said transistor being connected by said base terminal to said power-control means, wherein said transistor controls said power-supply signal and is controlled by said power-control means;

a light emitting diode (LED) connected with said collector terminal of said transistor and which luminesces when said transistor is on;

a resistor having a first terminal connected with said driver of said power-supply and a second terminal;

a photo-transistor having a collector terminal connected with said second terminal of said resistor, wherein said photo-transistor varies an electric potential of said resistor in accordance with an amount of light received from said light emitting diode, and thereby varies said operation voltage of said driver which is output to said switching mechanism.

3. The power-supply controller for a computer as in claim 2, wherein:

said transistor of said power-mode control circuit is turned on and said light emitting diode luminesces when said power-supply signal received from said power control means is at a high voltage;

said photo-transistor increases an electric potential of said resistor when said photo-transistor receives light from said light emitting diode;

said driver outputs a lower output voltage to said switching mechanism and said switching mechanism is thereby turned off when a potential of said resistor is increased by said photo-transistor; and said power-supply fails to output a DC voltage when said switching mechanism is turned off.

4. The power-supply controller for a computer as in claim 1 wherein:

said driver varies an operation voltage according to an operation of said power-mode control circuit, and controls an on/off state of said switching mechanism.

* * * * *